United States Patent
Christenson et al.

(10) Patent No.: US 8,260,479 B2
(45) Date of Patent: Sep. 4, 2012

(54) MODULAR SOFTWARE ARCHITECTURE FOR AN UNMANNED AERIAL VEHICLE

(75) Inventors: Julie Christenson, Albuquerque, NM (US); Linda Watson, Corrales, NM (US); Jeffrey McNamara, Rio Rancho, NM (US)

(73) Assignee: Honeywell International Inc., Morristown, NJ (US)

( * ) Notice: Subject to any disclaimer, the term of this patent is extended or adjusted under 35 U.S.C. 154(b) by 886 days.

(21) Appl. No.: 12/331,274

(22) Filed: Dec. 9, 2008

(65) Prior Publication Data
US 2010/0145556 A1 Jun. 10, 2010

(51) Int. Cl.
*G06F 19/00* (2011.01)
(52) U.S. Cl. ........... 701/15; 701/3; 370/392; 370/395.5; 355/72; 324/163; 60/226.1; 600/428
(58) Field of Classification Search ........ 701/3; 370/392, 370/395.5; 355/72; 324/163; 60/226.1; 600/428
See application file for complete search history.

(56) References Cited

U.S. PATENT DOCUMENTS

| | | | |
|---|---|---|---|
| 6,056,237 A | 5/2000 | Woodland | |
| 6,317,659 B1 | 11/2001 | Lindsley et al. | |
| 6,665,594 B1 | 12/2003 | Armstrong | |
| 6,811,113 B1 | 11/2004 | Silansky et al. | |
| 6,868,314 B1 * | 3/2005 | Frink | 701/3 |
| 6,923,404 B1 | 8/2005 | Liu et al. | |
| 7,228,232 B2 | 6/2007 | Bodin et al. | |
| 7,270,296 B2 | 9/2007 | Box et al. | |
| 2003/0033798 A1 * | 2/2003 | Dickau | 60/226.1 |
| 2003/0053459 A1 * | 3/2003 | Brouk et al. | 370/392 |
| 2003/0057941 A1 * | 3/2003 | Collier-Hallman et al. | 324/163 |

(Continued)

FOREIGN PATENT DOCUMENTS
WO 2007084172 A2 7/2007
(Continued)

OTHER PUBLICATIONS

A. Ryan et al., "A Modular Software Infrastructure for Distributed Control of Collaborating UAVs", American Institute of Aeronautics and Astronautics (AIAA) Conference on Guidance, Navigation, and Control, AIAA, Aug. 2006, Keystone CO, available at http://www.calccit.org/c3uv/papers/2006/gnc2006_AR_XX_SR_JT_MZ_DC_RS_JKH.pdf (last visited Dec. 9, 2008).

(Continued)

*Primary Examiner* — James P Trammell
*Assistant Examiner* — Sanjeev Malhotra
(74) *Attorney, Agent, or Firm* — Shumaker & Sieffert, P.A.

(57) ABSTRACT

A method for developing software as a layered, segmented system having diverse functionalities, based on a software architecture and an aerial vehicle utilizing the software architecture are provided. The software architecture for the aerial vehicle, such as an unmanned aerial vehicle (UAV) includes an electrical segment, a propulsion segment, a flight management segment, a navigation segment, a data link segment, and perhaps a payload segment. Each segment includes a number of software modules and objects, and each segment interfaces with or controls one or more devices. The software architecture also includes a number of layers, including an executive layer for managing execution rates of the segments, a vehicle controller layer for coordinating activities across segments, and various layers providing utilities, common services, and computing support including operating system support. Rules of engagement guiding interaction between software entities within the software architecture are specified.

18 Claims, 4 Drawing Sheets

U.S. PATENT DOCUMENTS

| | | | |
|---|---|---|---|
| 2003/0060962 A1 | 3/2003 | Carroll | |
| 2004/0024311 A1* | 2/2004 | Quaid, III | 600/428 |
| 2004/0030449 A1 | 2/2004 | Solomon | |
| 2004/0034302 A1* | 2/2004 | Abovitz et al. | 600/428 |
| 2005/0189450 A1 | 9/2005 | Roeseler et al. | |
| 2006/0007935 A1* | 1/2006 | Bennett et al. | 370/395.5 |
| 2006/0114445 A1* | 6/2006 | Ebihara | 355/72 |
| 2006/0226280 A1 | 10/2006 | Alman | |
| 2006/0249622 A1 | 11/2006 | Steele | |
| 2006/0249623 A1 | 11/2006 | Steele | |
| 2007/0023582 A1 | 2/2007 | Steele et al. | |
| 2007/0244608 A1 | 10/2007 | Rath et al. | |
| 2007/0246610 A1 | 10/2007 | Rath et al. | |
| 2008/0210818 A1 | 9/2008 | Chiu et al. | |

FOREIGN PATENT DOCUMENTS

| | | |
|---|---|---|
| WO | 2008085536 A2 | 7/2008 |

OTHER PUBLICATIONS

H.M. Huang et al., "A Framework for Autonomy Levels for Unmanned Systems (ALFUS)", Proceedings of the Association for Unmanned Vehicle System International (AUVSI)'s Unmanned Systems North America 2005, AUVSI, Jun. 2005, Baltimore MD, available at http://www.isd.mel.nist.gov/documents/huang/ALFUS-auvsi-8.pdf (last visited Dec. 9, 2008).

H.M. Huang et al., "Autonomy Levels for Unmanned Systems (ALFUS) Framework", vol. II: Framework Models, National Institute of Standards and Technology (NIST) Special Publication 1011-II-1.0, NIST, Dec. 2007,available at http://www.isd.mel.nist.gov/projects/autonomy_levels/NISTSP1011-II-1.0-framework.pdf (last visited Dec. 9, 2008).

B. Kirk, "Understanding the Art of Modular Engineering", Microprocessors and Microsystems, vol. 14, No. 3, 3 pages, Apr. 1, 1990.

"Modular Design Review", Internet Article, http//www.mcs.anl.gov/{itf/dbpp/text/node40.html, 3 pages, 1995.

European Search Report from corresponding EP Application No. 09172122.5, mailed Nov. 18, 2009, 2 pages.

European Examination Report from corresponding EP Application No. 09172122.5, mailed Jun. 29, 2010, 5 pages.

Reply to communication from the Examining Division, for EP Application No. 09172122.5, dated Oct. 28, 2010, 11 pages.

* cited by examiner

| Executive Layer 210 | | | | | | |
|---|---|---|---|---|---|---|
| Vehicle Controller Layer 220 | | | | | | |
| Electrical 230 | Propulsion 240 | Flight Management 250 | | Navigation 260 | Data Link 270 | Payload 280 |
| | | Integration Layer 282<br>Managers, segment/functional integrators,<br>Flight Planning,<br>Flight Controls & Flight Guidance | | | | |
| | Fuel Controller | Abstract Device Layer 284 | | Pressure Altimeter, Ambient Temp. | Engr. TLM Radio | |
| Control Panel, Lights, Power Control & Monitor | ECU, Fuel Pump, Fuel Tank | Physical Device Layer 286<br>Flight Control Devices | | Magnetometer Navigation Devices, Proximity, Pressure & Temp. Sensors | Radios, Removable Storage Devices, Data Links | Camera, Lasers, Payload Sensors |
| Segment Utility Layer 288 | | | | | | |
| Common Services Layer 290 | | | | | | |
| Board Support Package/Operating System Layer 292 | | | | | | |
| Computing Platform Layer 294 | | | | | | |

Device Layer: { Abstract Device Layer 284, Physical Device Layer 286, Segment Utility Layer 288 }

Platform Services Layer: { Common Services Layer 290, Board Support Package/Operating System Layer 292, Computing Platform Layer 294 }

*Figure 2*

MODULAR SOFTWARE ARCHITECTURE FOR AN UNMANNED AERIAL VEHICLE

GOVERNMENT LICENSE RIGHTS

This invention was made with U.S. Government support under Contract No. W56HZV-05-C-0724 awarded by the Department of the Army. The U.S. Government may have certain rights in this invention.

BACKGROUND OF THE INVENTION

1. Field of the Invention

This invention relates to the field of software architecture. More particularly, this invention relates to modular software architecture organized by layers and segments which can be applied to systems which contain multiple domains or functionality, such as unmanned aerial vehicles (UAVs).

2. Background

Unpiloted aircraft, such as UAVs, are used by the military, police, rescue, scientific, and commercial communities. One definition of a UAV is an unmanned device capable of controlled, sustained, and powered flight. As such, the designs of UAVs consist of aircraft of various sizes, capabilities, and weights. A typical UAV consists of a propulsion device, such as an engine, a navigation system, one or more payload sensors, and possibly cargo. The sensors may provide information to a ground observer about the terrain the UAV overflies, such as video information about a lost hiker in a rescue application, information from laser and/or biological sensors about environmental conditions in a scientific or security application, or a combination of video, laser, biological and other sensors concerning battlefield conditions in a military application. The cargo may be munitions, food, medicine, and/or other goods depending on the mission of the UAV. As technology improves, the design of the UAV may change to integrate new and/or improved sensors, navigation systems, propulsion devices, and the like.

As the UAV is unmanned, computer software executing on one or more processors aboard the UAV partially or completely controls the UAV. The computer software may control the various functions performed by the UAV, perhaps with the aid of the ground observer.

SUMMARY

A first embodiment of the invention provides a method of developing software to control a segmented and layered system. The segmented and layered system includes a plurality of devices. Integrated functionality is determined for each of one or more segments of the segmented and layered system. Each segment includes one or more software entities arranged in one or more layers. For each segment, one or more of the plurality of devices is associated with the segment and one or more of the software entities of the segment are associated with each of the associated one or more devices. A segment integrator is determined for each segment of the one or more segments. One or more rules of engagement are determined for the software. The software to control the segmented and layered system is developed based on the integrated functionality of each of the one or more segments and the one or more rules of engagement. The segmented and layered system includes a computing device, and the software is executable on the computing device.

A second embodiment of the invention provides an aerial vehicle. The aerial vehicle includes a control panel, an engine control unit (ECU), one or more flight control devices, one or more navigation devices, one or more communication devices, a processor, data storage, and software. The one or more communication devices include one or more radios and/or one or more data links. The software is stored in the data storage and executable by the processor. The software includes one or more segments. The one or more segments include: an electrical segment, configured to interface with the control panel, a propulsion segment, configured to interface with the ECU, a flight management segment, configured to interface with the one or more flight control devices, a navigation segment, configured to interface with the one or more navigation sensors, and a data link segment, configured to interface with the one or more communication devices.

BRIEF DESCRIPTION OF THE DRAWINGS

Various examples of embodiments are described herein with reference to the following drawings, wherein like numerals denote like entities, in which:

FIG. 2 shows an example software architecture for controlling a segmented and layered system, in accordance with embodiments of the invention;

DETAILED DESCRIPTION

Figure 1:
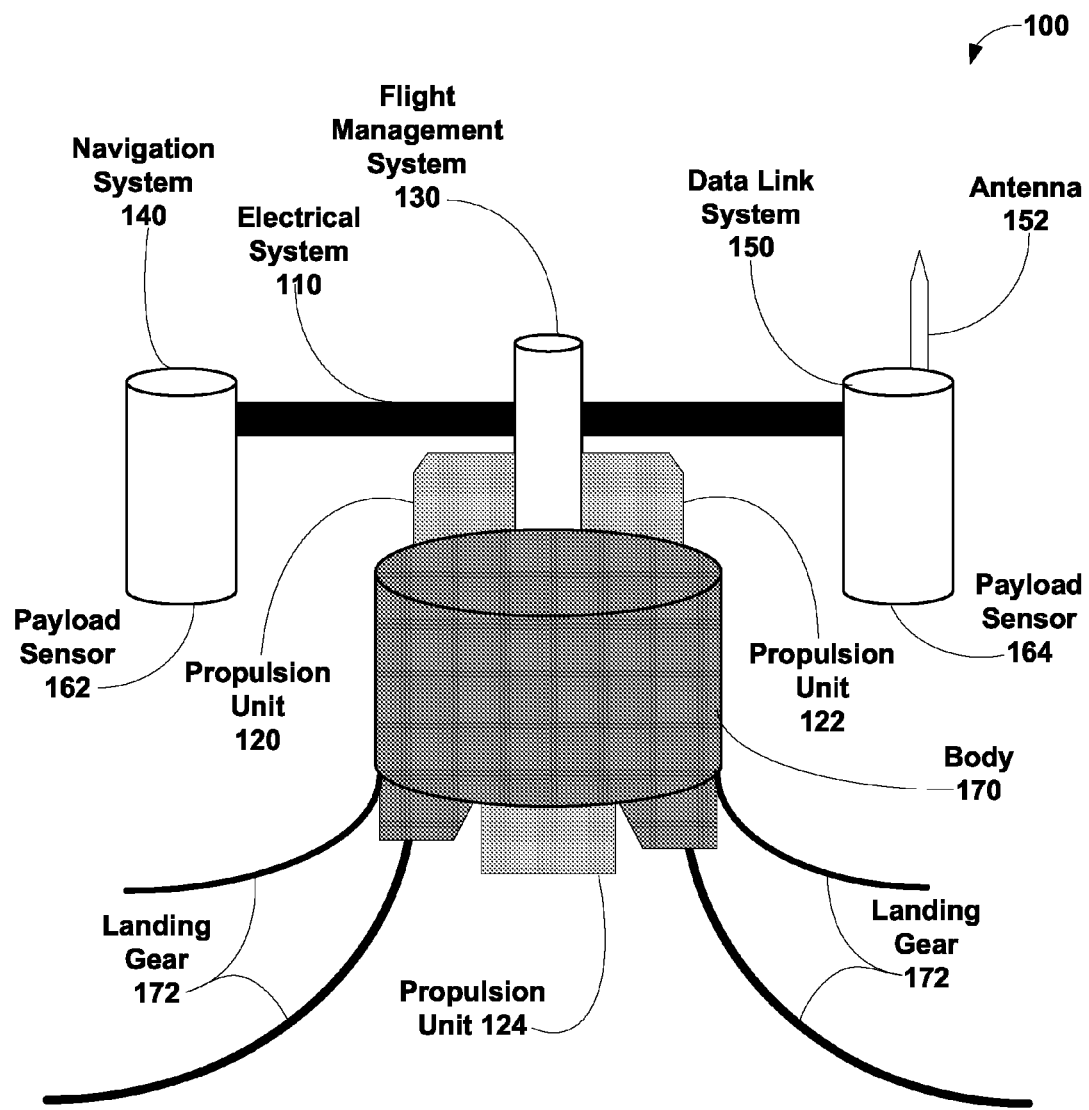
FIG. 1 shows an example UAV, in accordance with embodiments of the invention.

The present invention includes a method for developing software to control a layered, segmented system, such as a UAV or other aerial vehicle. To coordinate software development, a segmented and layered architecture is provided. The segmented and layered architecture comprises both a number of segments and a number of layers. The segments are organized so that each segment interfaces with and/or controls one or more related devices. For example, a propulsion segment may be used to control one or more engine control units (ECUs), braking units, and/or fuel controllers, an electrical segment may be used to interface with electrical devices, such as a control panel, power control switches, power supply monitors and/or lights, and a navigation segment may be used to interface with navigation and location sensors.

The segmented and layered architecture provides a framework for well-designed software that promotes loose coupling between "software entities". Example software entities are software objects, modules, functions, subroutines, code, computer data, data objects, databases, and/or data structures. Many other software entities are possible as well.

The layers support a hierarchy, in which software entities may be placed in a layer based on a role of the entity. The layers of the segmented and layered architecture comprise functions that are generally common to all segments. For examples, an executive layer may schedule one or more tasks executing operations for a segment, a controller layer may coordinate activities between segments and perhaps between layers, and a utility layer may provide functions for use by all segments. The segmented and layered architecture may specify rules to govern the interaction between objects in different layers and/or segments.

In particular, the segmented and layered architecture is well suited to maintain continuity and best practices between several related and evolving projects. For example, suppose a common segmented and layered architecture is used between four projects, each one evolving from the previous project(s). The lessons learned from the first project as embodied in the common segmented and layered architecture are then automatically applied in the latter three projects, as they use the common segmented and layered architecture.

An example software architecture is provided for a UAV. The UAV software architecture includes a propulsion segment, an electrical segment, a flight management segment for controlling the flight of the UAV, a navigation segment, a data link segment for communications, and a payload segment. The layers of the UAV software architecture include an executive layer, a vehicle controller layer, layers specific to the segments, a segment utility layer, a common services layer, a board support package/operating system layer providing functions traditionally provided by operating systems, and a computing platform layer for controlling/interfacing with computer hardware. The UAV software architecture is readily applicable to other segmented and layered systems as well, such as manned aerial vehicles, other military and commercial vehicles operating on land, sea, or air, or factory equipment, as non-limiting examples.

Additional segments or layers could readily be added that utilize the same layered structure of the UAV software architecture. For example, a user interface segment and corresponding user interface layer could be added. A user interface may contain a segment that controls user input (e.g., steering devices) and/or user output (e.g., heads-up displays, integrated data pages, and/or other user displays) devices. A corresponding layer (perhaps above the Vehicle Controller layer, described below with reference to FIG. 2 below, or replacing parts of the Vehicle Controller layer) may be added to allow the user interface access and control to the other segments as required to provide operator control to segment functionality. Additional segment options may include a life-support segment that provides and controls devices and sensors, such as air-flow and temperature control devices, to maintain a human operator of the segmented and layered system. Another example segment may be an a situational awareness segment for a unit, such as a manned aircraft or motor vehicle, displaying situational information, such as one or more digital maps, current location information of the unit and/or other units, unit types (e.g., fighter, UAV, truck, automobile), size(s), and/or unit status information (e.g., friendly, unknown, and/or unfriendly). In addition, an environmental segment displaying information about the environment of the unit, such as temperature, humidity, radiation levels, biological-sensor information, and the like is possible. Many other segments and layers are possible as well.

As a software architecture becomes widely disseminated among development organization(s) creating the segmented and layered systems, the software developers writing code for the segmented and layered system may communicate more effectively by utilizing the terminology of the architecture as a common language across development groups. The use of a common language increases the effectiveness of each person by (a) providing an overall structure for the software development effort and (b) providing a widely available resource for explaining the segmented and layered system to stakeholders in the software development effort, including but not limited to, software developers, management, customers, and third-party suppliers. By dividing the software architecture into segments, the software developers may work on the segments independently. Further, use of the common language aids training activities as well.

As the software architecture provides common and well-known interfaces, the amount of software development effort required to adapt software entity controllers, and even segments and layers for reuse in new or different projects decreases. The ability to reuse software and communicate effectively saves development time as reused software requires less development time and communication time between developers using a common language. As reused software has been debugged, the number of bugs in the segmented and layered system and thus overall debugging effort decreases while simultaneously increasing overall system reliability and quality. Further, "plug-and-play" software entities may be designed to adhere to the interfaces defined by the software architecture and then used with little or no development on other segmented and layered systems that also adhere to the interfaces defined by the software architecture. The use of segments and layers in the software architecture minimizes the impact of changing, adding, and/or removing devices, as technologies, missions, and/or markets change, as well as reducing development time by facilitating the ability for software developers to work on separate segments and/or layers defined within the framework of the segmented and layered system. Thus, the use of the software architecture may increase understanding and communication about the segmented and layered system and overall quality, decrease system development time and cost, and speed efforts to adapt reused software to new projects sharing part or all of the same software architecture.

An Example UAV

Turning to the figures, FIG. 1 shows an example UAV 100, in accordance with embodiments of the invention. FIG. 1 shows the UAV 100 with an electrical system 110, propulsion units 120, 122, and 124, a flight management system 130, a navigation system 140, a data link system 150 with an antenna 152, payload sensors 162 and 164, a body 170, and landing gear 172.

The electrical system 110 may include various devices and equipment to provide and monitor the flow of electricity throughout the UAV 100, such as, but not limited to, wires, cables, switches, lights, electrical devices (e.g. capacitors, inductors, diodes, transistors, etc.), light emitting diodes (LEDs), power devices (such as generators and/or batteries), electrical sensors, fuses, and/or circuit breakers. The electrical system 110 may also include a control panel as well for monitoring and controlling the electrical system 110. The electrical system 110 may include other electrically-powered devices, such as (but not limited to) anti-collision lights and battery charging/monitoring circuitry.

The propulsion units 120, 122, and 124 may provide power to move the UAV 100. The propulsion units may include one or more engines, fans, pumps, rotors, belts, and/or propellers. One or more engine control units (ECUs) may control the propulsion units 120, 122, and 124. For example, an ECU may control fuel flow in an engine based on data received from various engine sensors, such as air and fuel sensors. The propulsion units 120, 122, and 124 may have one or more fuel tanks, one or more fuel pumps to provide the fuel from the fuel tank(s) to the propulsion units 120, 122, and 124, and/or one or more fuel controllers. The propulsion units 120, 122, and 124 may also include one or more fuel-level sensors to monitor the fuel tank(s).

The flight management system 130 may provide flight planning, flight guidance, and flight controls functionality for the UAV 100, akin to the control provided by a human pilot in a manned aircraft. The flight management system 130 may include flight control algorithms and/or servos (electro-mechanical devices) that manipulate various flight-control surfaces of the UAV 100. For example, one or more servos may control a rudder or aileron(s) of the UAV 100. The flight management system may include a throttle control mechanism, instead or as well.

The navigation system 140 may provide navigational data, including data about nearby aircraft, to the UAV 100. The navigation system 140 may include location devices for the UAV 100, such as, but not limited to, magnetometers, gyroscopes, lasers, Global Positioning System (GPS) receivers, altimeters, inertial navigation units, ground proximity sensors, and other navigation components. The location devices may include additional sensors to provide additional data about the environment for the UAV 100, such as pressure sensors, thermometers, and/or other environment sensors.

The data link system 150 may permit communication between the UAV 100 and other devices. For example, the data link system 150 may permit communication with other UAVs in use at the same time as the UAV 100. The data link system 150 may permit communication with one or more ground control devices as well. The data link system 150 may use one or more wireless communication devices, such as an antenna 152, for communication. In an alternative not shown in FIG. 1, the data link system 150 may use one or more wired communication devices, such as Ethernet cables, ports, and/or cards, perhaps while the UAV 100 is tethered to the ground. The data link system 150 may include one or more (ports for) removable and/or down-loadable storage devices. The removable and/or down-loadable storage devices may store data such as, but not limited to, telemetry and sensor data (e.g., video data, audio data, images, and/or collected data on sensor readings).

The UAV 100 may be equipped with a payload including payload sensors 162 and 164. The payload sensors 162 and 164 may include video sensors, such as cameras, laser designators, chemical sensors, biological sensors, smoke detectors, radiation detectors, electromagnetic wave detectors, and other payload sensors. The UAV 100 may be configured so that the payload sensors 162 and 164 may change between missions as well.

For structural support and other reasons, the UAV 100 may have a body 170 and landing gear 172. The shapes of the body 170 and/or landing gear 172 shown in FIG. 1 are examples only and may vary. For example, the body 170 may have an aerodynamic shape, such as found in a body of a conventional manned aircraft. The landing gear 172 may or may not have controls, such as controls that allow the landing gear 172 to be retracted into the body 170.

An Example Software Architecture

FIG. 2 shows an example software architecture 200 for controlling a segmented and layered system, such as the UAV 100, in accordance with embodiments of the invention. FIG. 2 shows the software architecture 200 including a number of layers, including an executive layer 210, a vehicle controller layer 220, an integration layer 282, a physical device layer 284, a segment utility layer 288, a common services layer 290, a board support package/operating system layer 292, and a computing platform layer 294. FIG. 2 also shows the software architecture divided into a number of segments as well, including an electrical segment 230, a propulsion segment 240, a flight management segment 250, a navigation segment 260, a data link segment 270, and a payload segment 280.

FIG. 2 shows boundaries between segments using dotted lines. Some layers may be common between segments. These layers may contain functionality that is not specific to a segment, is shared by all segments, and/or requires integration of functionality across one or more segments. FIG. 2 shows common layers as layers not intersected by segment boundaries, such as the executive layer 210 and the vehicle controller layer 220 at the top of FIG. 2, and the common services layer 290, the board support package/operating system layer 292, and the computing platform layer 294 at the bottom of FIG. 2. Some layers may be segment-specific, or uncommon between segments. FIG. 2 shows segment-specific layers as being intersected by segment boundaries, such as the integration layer 282, abstract device layer 284, the physical device layer 286, and the segment utility layer 288. As shown in FIG. 2, the layers provide increasing levels of abstraction going from bottom to top.

The executive layer 210 may schedule the execution of software in the segmented and layered system. The executive layer 210 may ensure that power-up operations, such as initializing processors and performing power-up built in tests (PBITs), are performed upon powering up the segmented and layered system. Once the power-up operations are complete, the executive layer 210 may then ensure "rate control" within the system. The rate control of a task, such as a segment integrator, indicates a number of "execution cycles" or number of times the task will be executed per unit amount of time, and therefore may be specified in hertz (Hz). For example, if a task has a rate control of 20 Hz, the executive layer 210 will ensure the task is executed 20 times per second. The same rate control may be specified in terms of the maximum amount of time between execution cycles—for the same example task executing 20 times per second, the rate control would be 50 milliseconds as specified in terms of the maximum amount of time between execution cycles.

The vehicle controller layer 220 may coordinate execution of tasks among the segments of the segmented and layered system. For example, the vehicle controller layer 220 may ensure that external commands, perhaps received from the data link segment 270, are then dispatched to the various segments of the segmented and layered system. Once an external command is dispatched, each segment may then perform the task(s) required by the segment to carry out the external command. After the task(s) are performed (or the segment determines the task(s) cannot be performed), the segment may then report result(s) to the vehicle controller layer 220. The vehicle controller layer 220 may then send a response to the external command, perhaps using the data link segment 270.

The vehicle controller layer 220 may maintain a state and/or a mode of the segmented and layered system. In particular, the vehicle controller layer may coordinate execution of built-in tests (BITs) to determine the state of the system. The BITs may be run periodically (e.g., once per hour), upon demand, or based on resource limits (e.g., available memory or processor idle time). The state may be termed a "health" of the segmented and layered system. The mode of the segmented and layered system may indicate an operation being performed or to be performed by the segmented and layered system, such as "landing the UAV", "awaiting input", "turning left", and so on. Many other states and/or modes are possible as well.

The integration layer 282 may include integration objects. As shown in FIG. 2, the integration layer 282 may include integration objects such as segment integrators and functional integrators. Each segment has a segment integrator. For example, a navigation-segment integrator may provide a complete navigation solution that is derived from data from navigation device(s) for the segmented and layered system.

A segment integrator may coordinate activities within a segment, perhaps by scheduling thread or object execution within a segment budget. The segment budget for a segment may be provided by the executive layer 210 as part of the rate control for the segment, e.g., a 20 Hz task representing the segment may have a segment budget of 10 milliseconds of execution time. The segment integrator may contain functionality that must be executed at multiple rates and thus, may be executed by multiple tasks. The segment budget may also, or instead, include other resources such as memory, semaphores, events and/or handles, device access (e.g., access to sensors, motors, controls, input devices, and/or output devices).

A segment integrator for a given segment may provide control within the segment, status of the segment and/or access external data for the given segment. As such, the segment integrator may allow for concentration of system-dependent requirements in the segment integrator, as well as providing an interface to data and services supported by the given segment. Preferably, the data interface is a rate-safe data-passing mechanism common to all segments in the segmented and layered system; that is, the data interface passes data between segments and conforms to the rate control enforced by the executive layer 210. The rate-safe data-passing mechanisms protect data accessed at multiple rates—for example, suppose a lower-rate task required access to protected data D for reading and a higher-rate task had access to D for writing. The use of rate-safe data-passing mechanisms would allow the lower-rate task to safely and quickly read D before D is modified by the higher-rate task. Note that a functional integrator may also use the rate-safe data-passing mechanism as well.

The segment integrator may create and enforce an authorized-access interface to software entities of the given segment by the remainder of the segmented and layered system, perhaps using data-hiding techniques. The segment integrator for the given segment preferably is the only software entity in the segmented and layered system with complete access to the other software entities in the given segment. Ensuring the only access to the given segment is via the authorized-access interface isolates implementation changes to the given segment as long as the changed implementation conforms to the authorized-access interface. In addition, publishing of the authorized-access interface to the given segment permits for third-party implementation of the segment.

The segment integrator for a given segment may collect and maintain testing information for the given segment, as well as the health and testing information for the sensor(s) and other devices of the given segment. The testing information may include schedules, records, and results of BITs for the sensor(s) of the given segment as well as any diagnostics or other tests written to verify the performance of the given segment and/or the sensor(s) and other devices of the given segment. The segment integrator may analyze the testing information to determine the health of a sensor. For example, the segment integrator may determine a sensor's health is "unhealthy" if the sensor failed the last BIT run on the sensor or that the sensor's health is "healthy" if the sensor passed the last BIT run on the sensor.

The segment integrator may enable communication between sensors and other devices of the given segment. For example, if a given segment has a camera and a feature analysis device that determines specific features in image data, then the segment integrator may enable communication of the image data from the camera is passed on to the feature analysis device for analysis. By ensuring communication goes through the segment integrator, software controlling and/or interfacing with the device(s) is simpler to write as the software need not include communication support and is less error-prone as all communication uses a common interface via the segment integrator.

A functional integrator for a given segment may provide an "integrated function" or derived functionality within the given segment. As such, the functional integrator may provide the integrated function by coordinating data flows between segments and/or within the segment with the functional integrator. For example, a data-link integrated function may receive data from several other segments for communications to devices outside of the segmented and layered system. As another example, a flight-management integrated function may coordinate required navigation and environmental information from other segment(s) to provide flight guidance, flight controls, and flight planning functionalities for the system.

Each segment may have a device layer. As shown in FIG. 2, the device layer is divided into the abstract device layer 284 and the physical device layer 286. The abstract device layer 284 of a given segment provides an interface for software entities to one or more devices in the given segment. The abstract device layer may contain objects that combine outputs of several physical devices to form an "abstract" device. As such, an abstract device may provide derived functionality not provided by the available physical devices. For example, a pressure altimeter may be an abstract device combining data outputs from a physical pressure sensor and a physical temperature sensor to compute a pressure altitude value.

Similarly, a fuel-controller abstract device may provide an operation to provide an amount of fuel value. The amount of fuel may be calculated using fuel burn rate or fuel level sensor. The fuel-controller abstract device may be responsible for controlling the fuel flow rate to the engine.

Objects in the abstract device layer 284 may only be able to access software entities within the physical device layer 286 and the segment utility layer 286 of the given segment or from layers shown below the abstract device layer 284 in FIG. 2; that is, software entities within the segment utility layer 288, the common services layer 290, the board support package/operating system layer 292, and the computing platform layer 294.

The physical device layer 286 may be implemented as a group of objects (or other software entities) per physical device in the given segment. For example, FIG. 2 shows the electrical segment 230 with a control panel as a physical device. Similarly, the ECU, fuel pump, and fuel tank as physical devices of the propulsion segment 240, and so on for the other segments 250, 260, 270, and 280. Physical devices in the physical device layer may be designed to facilitate replacement for either a specific purpose or for improved technology, such as radios (i.e., replace for an improved range or tuning to a specific frequency), cameras, navigation sensors, and/or other physical devices.

Each physical device in the physical device layer 286 may maintain its own health information and provide that health information upon request, including executing, tracking progress and/or providing test results of any applicable BITs and/or other tests. As with the abstract device layer 284, software entities in the physical device layer 286 should only access software entities in the segment utility layer 288 of the given segment and in layers below the physical device layer 286 as shown in FIG. 2; that is, software entities within the common services layer 290, the board support package/operating system layer 292, and the computing platform layer 294.

The segment utility layer 288 may include segment-specific utilities for the given segment. For example, the data link segment 270 may include utilities to format, compress, and/or decompress messages. As another example, each segment may include specific data-conversion functionality as segment-specific utilities; for example, conversions between latitude-longitude coordinates and internal map coordinates may be in the segment utility layer 288 of the navigation segment 260.

The common services layer 290 may include segment-independent utilities shared across segments. Example segment-independent utilities are unit conversions for distances, angles, speeds, and accelerations. Other segment-independent utilities include data-structure functionality (e.g., linked lists, persistent memory, buffers, queues, trees), and input/output functionality. All objects within the segmented and layered system may be required to use the segment-independent utilities of the common services layer 290. If all objects within the segmented and layered system use the segment-independent utilities, then the segment-independent utilities become standards that ensure common behavior throughout the system as well as reducing the sources of error (and thus the amount of debugging required) for the functionality of the segment-independent utilities.

The segmented and layered system may have a platform services layer. FIG. 2 shows the platform services layer including the board support package/operating system layer 292 and the computing platform layer 294. The board support package/operating system layer 292 includes utilities provided by a board support package, or low-level utilities used to support a given circuit board and its interaction with a given operating system. The operating system may provide utilities to manage, schedule, and coordinate processes, threads, and resources common throughout the segmented and layered system. The board support package may tailor the operating system for a particular hardware platform, and as such may provide software and/or data about memory ranges, input/output access points (memory addresses or and/or interrupt vectors), read-only memory (ROM) images, initialization and/or boot parameters, device drivers, and/or bus information. As such, the operating system utilities may include part or all of the board support package. The operating system may provide services, such as data structures (e.g., message queues) and/or locking/unlocking mechanisms (e.g., semaphores or blocking messages) that may be used to protect critical sections of software and/or critical data.

The computing platform layer 294 may include wired communication device drivers supporting devices such as Universal Serial Bus (USB), Small Computer System Interface (SCSI), Fire-Wire (IEEE 1394 standard) RS-232, modems, and/or Ethernet devices. The computing platform layer 294 may include wireless-communication device drivers supporting devices such as Bluetooth™, ZigBee (IEEE 802.15.4 standard), Wireless Wide Area Network (WWAN), Wi-Fi (IEEE 802.11 standard), and/or Wi-MAX (IEEE 802.16 standard) devices.

Rules of engagement may specify guidelines and/or rules for interactions between software entities within the software architecture 200. Table 1 below shows example rules of engagement for the software architecture of FIG. 2.

TABLE 1

Example Rules of Engagement

1. Software entities in a higher layer as shown in FIG. 2 may include software entities from a lower layer but not vice versa.
2. Software entities in the executive layer 210 and the vehicle controller layer 220 may interface software entities in lower layers across all segments in the software architecture 200. However, data and services should be obtained from the segments through segment integrators whenever possible.

TABLE 1-continued

Example Rules of Engagement

3. The executive layer 210 and the vehicle controller layer 220 should not directly access physical devices in the physical device layer 286 or abstract devices in the abstract device layer.
4. Segment and functional integrators in the integration layer 282 should share data through common rate-safe protected data passing mechanisms.
5. Software entities in the devices layer of a segment should not interface directly with each other or with devices in another segment.
6. If a physical or abstract device Device1 requires information from another physical or abstract device Device2 within the same segment Segment1, the information from Device2 should be provided through a functional or segment integrator in Segment1. An abstract device in Segment1 can access data from one or more physical devices in the same segment Segment1.
7. If a device Device1 in a segment Segment1 requires information from another device Device2 within a different segment Segment2, the information from Device2 must be obtained through the integrator layer 282. In particular, the segment integrator in Segment1 must interface with the segment integrator in Segment2 in order to obtain the required information from Device2.

Many other rules of engagement to govern interaction between software entities with the software architecture 200 are possible as well.

An Example Computing Device

Figure 3:
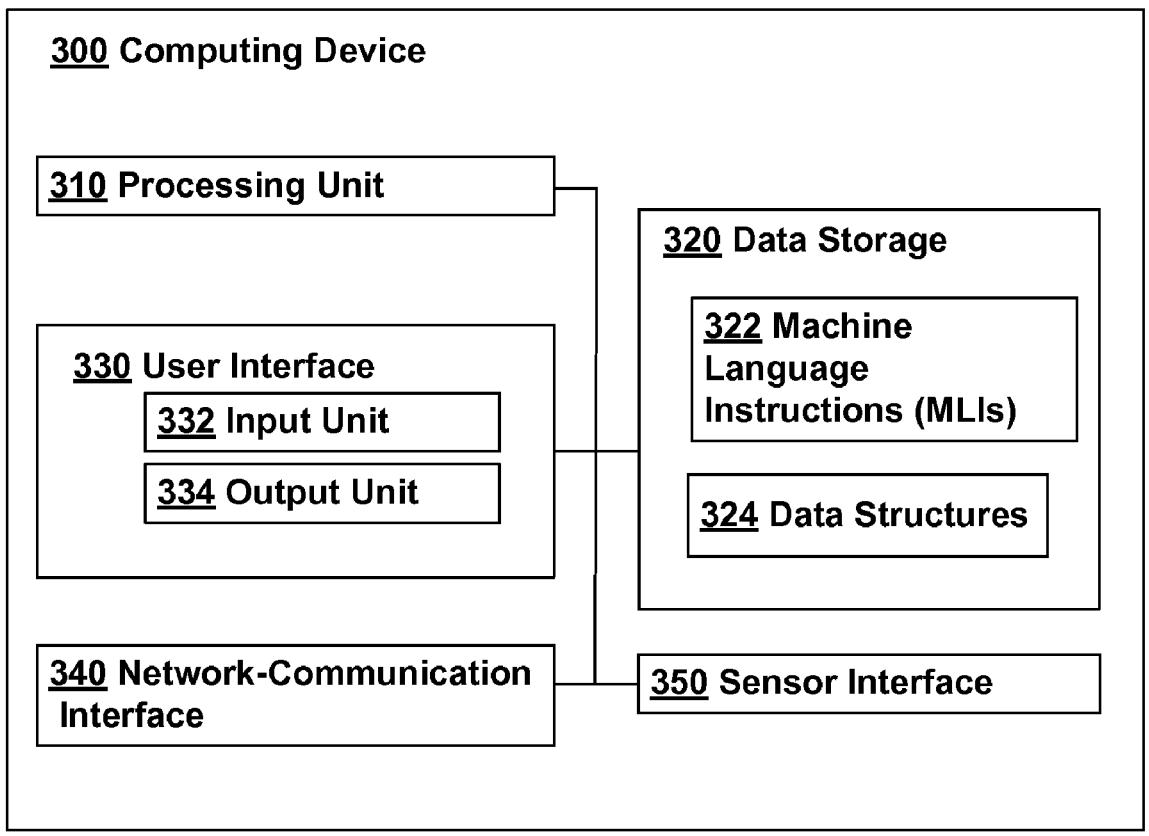
FIG. 3 is a block diagram of an example computing device, in accordance with embodiments of the invention.

FIG. 3 is a block diagram of an example computing device 300, comprising a processing unit 310, data storage 320, a user interface 330, a network-communication interface 340, and a sensor interface 350, in accordance with embodiments of the invention. A computing device 300 may be a desktop computer, laptop or notebook computer, personal data assistant (PDA), mobile phone, embedded processor, computer board (e.g., motherboard) or any similar device that is equipped with a processing unit capable of executing machine-language instructions that implement at least part of the herein-described method 400 described in more detail below with respect to FIG. 4, and/or any or all of the herein-described software architectures.

The processing unit 310 may include one or more central processing units, computer processors, mobile processors, digital signal processors (DSPs), microprocessors, computer chips, and similar processing units now known and later developed and may execute machine-language instructions and process data.

The data storage 320 may comprise one or more storage devices. The data storage 320 may include read-only memory (ROM), random access memory (RAM), removable-disk-drive memory, hard-disk memory, magnetic-tape memory, flash memory, and similar storage devices now known and later developed. The data storage 320 comprises at least enough storage capacity to contain machine-language instructions 322 and data structures 324.

The machine-language instructions 322 and the data structures 324 contained in the data storage 320 include instructions executable by the processing unit 310 and any storage required, respectively, to perform some or all of the herein-described functions described with respect to one or more software architectures, including software entities, one or more segments, and/or layers of the one or more software architectures, and/or to perform some or all of the procedures described in method 400.

The user interface 330 may comprise an input unit 332 and/or an output unit 334. The input unit 332 may receive user input from a user of the computing device 300. The input unit 332 may comprise a steering device, keyboard, a keypad, a touch screen, a computer mouse, a track ball, a joystick, and/or other similar devices, now known or later developed, capable of receiving user input from a user of the computing device 300.

The output unit 334 may provide output to a user of the computing device 300. The output unit 334 may comprise a visible output device for generating visual output(s), such as one or more cathode ray tubes (CRT), liquid crystal displays (LCD), light emitting diodes (LEDs), printers, lights, and/or other similar devices, now known or later developed, capable of displaying graphical, textual, and/or numerical information to a user of computing device 300. The output unit 334 may alternately or additionally comprise one or more aural output devices for generating audible output(s), such as a speaker, speaker jack, audio output port, audio output device, earphones, and/or other similar devices, now known or later developed, capable of conveying sound and/or audible information to a user of computing device 300.

The network-communication interface 340 may be configured to send and receive data over a wired-communication interface and/or a wireless-communication interface. The data may be sent and received using digital and/or analog techniques, and may include textual, graphical, video, audio, binary data, and/or other types of data. The wired-communication interface, if present, may comprise a wire, cable, fiber-optic link or similar physical connection, such as a USB, SCSI, Fire-Wire, and/or RS-232 connection, to a data network, such as a wide area network (WAN), a local area network (LAN), one or more public data networks, such as the Internet, one or more private data networks, or any combination of such networks. The wireless-communication interface, if present, may utilize an air interface, such as a Bluetooth™, ZigBee, Wireless WAN (WWAN), Wi-Fi, and/or WiMAX interface to a data network, such as a WWAN, a Wireless LAN, one or more public data networks (e.g., the Internet), one or more private data networks, or any combination of public and private data networks. In some embodiments, the network-communication interface 340 is configured to send and/or receive data over multiple communication frequencies, as well as being able to select a communication frequency out of the multiple communication frequency for utilization. The wireless-communication interface may also, or instead, include hardware and/or software to receive communications over a data-link via an antenna.

The sensor interface 350 may permit communication with one or more sensors to permit the sensors to provide sensor data to the computing device 300 and/or to receive commands that permit sensor maintenance (e.g., setup commands, configuration parameter settings, and the like). The sensor interface 350 may include a wired-sensor interface and/or a wireless-sensor interface. Examples of the one or more sensors include, but are not limited to, the physical devices shown in FIG. 2 and described above with respect to FIG. 2. The wired-sensor interface and the wireless-sensor interface may utilize the technologies described above with respect to the wired-communication interface of the network-communication interface 340 and the wireless-communication interface of the network-communication interface 340, respectively.

An Example Method for Software Development

Figure 4:
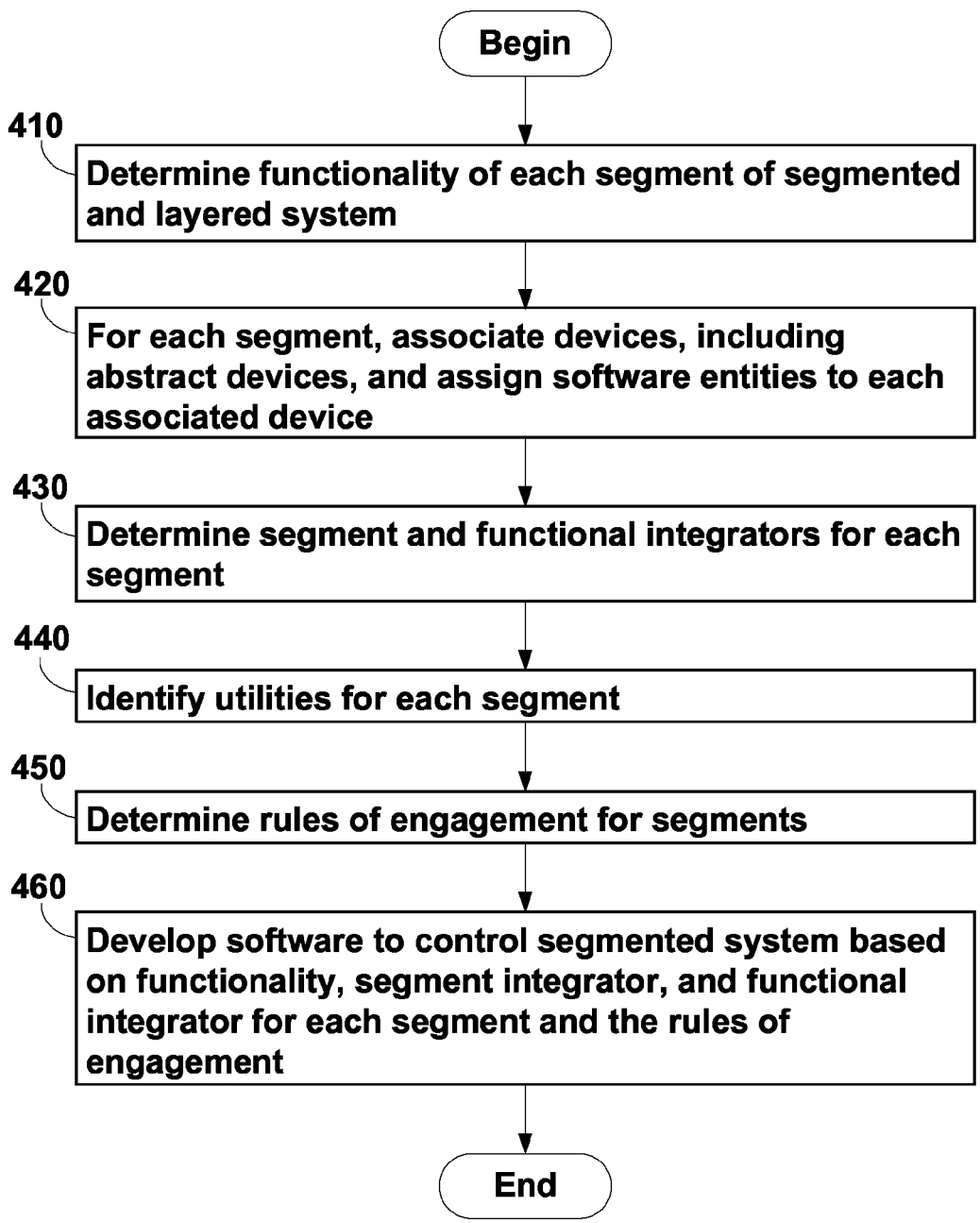
FIG. 4 is a flowchart depicting an example method for developing software for controlling a segmented and layered system, in accordance with embodiments of the invention.

FIG. 4 is a flowchart depicting an example method 400 for developing software for controlling a segmented and layered system, in accordance with embodiments of the invention. Method 400 provides a framework designed to permit software evolution as the segmented and layered system evolves, as technologies change, and/or as the segmented and layered system is reconfigured for different applications.

It should be understood that each block in this flowchart and within other flowcharts presented herein may represent a software entity, module, segment, layer, function, or portion of computer program code, which includes one or more executable instructions for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the described embodiments.

Method 400 begins at block 410. At block 410, functionality is determined for each of a plurality of segments of the segmented and layered system. Each segment may include a plurality of software entities, such as, but not limited to, computer software objects, modules, functions, subroutines, data objects, data structures, and/or other software structures. The software entities of the segmented and layered system, including software entities in each segment of the segmented and layered system, may include one or more machine-language instructions store in a computer memory, such as the data storage 320, and executable by a processor, such as the processing unit 310 and/or one or more data structures. The software entities may be stored on a computer-readable medium, such as a magnetic disk or disks (e.g., a hard drive), random access memory (RAM), read only memory (ROM), compact disc(s) (CDs), flash memory, magnetic tape and/or any other computer-readable medium suitable for storing software entities.

The segments may also play functional roles within the software architecture, such as an electrical segment controlling and/or interfacing with electrical devices (e.g., a control panel), a propulsion segment controlling and/or interfacing with propulsion devices (e.g., a fuel controller), a flight management segment providing flight planning, flight guidance, and/or flight controls functionality to control a flight of a vehicle (the vehicle acting as the segmented and layered system), a navigation segment providing navigation data by controlling and/or interfacing with navigation devices (e.g., a magnetometer), a data link segment providing communications with the segmented and layered system via radios, and a payload segment. Many other functional roles and, therefore, segments are possible as well.

The software architecture for the segmented and layered system may be divided into layers. Example layers are the executive layer, the vehicle controller layer, the device layer, the segment utility layer, the common services layer, and the platform services layer. Some layers may be divided into sub-layers, such as the device layer that is divided into the abstract services layer and the physical device layer. In particular, the segments of the software architecture may include some or all of the layers.

In combination, the software architecture may provide functionality that utilizes the functionality of several segments and/or layers outside of the segments. Example functionalities are a pre-launch functionality, a maintenance functionality, a communication functionality, a launch functionality, a flight functionality, and a landing operation functionality. Many other functionalities are possible as well.

At block 420, zero or more devices may be associated with the segment and one or more software entities in the plurality of software entities may be assigned to the associated zero or more devices. Once the one or more software entities are assigned to the one or more devices, the software entities may interface with and/or control the devices. The devices may be physical and/or abstract devices. For example, software entities (e.g., objects) in the abstract device layer and/or the physical device layer of a segment may interface with and/or control devices such as, but not limited to, a control panel, an ECU, flight control devices, navigation sensors/devices, radios, data links, and/or payload sensors. Example payload sensors are cameras, lasers, chemical sensors, biological sensors and radiation detectors. Many devices, including payload sensors, are possible as well. Note that if the segmented and layered system is equipped with a payload, the payload may also contain real-world objects along with or instead of payload sensors, such as cargo and/or munitions.

At block 430, segment integrator(s) and any possible functional integrator(s) are determined for each segment in the plurality of segments. A segment integrator for a given segment may provide control within the segment, status of the segment, and/or access external data for the given segment. The segment integrator may create and enforce an authorized-access interface to software entities of the given segment, perhaps using data-hiding techniques. The segment integrator for the given segment may collect and maintain testing and/or health information for the given segment and sensors and/or other devices associated with the given segment. The segment integrator may enable communication between sensors and/or other devices of the given segment. A functional integrator may provide an integrated function for the given segment by coordinating data flows between segments and/or within the segment with the functional integrator.

At block 440, one or more segment utilities may be identified for each segment. Example utilities include data conversion utilities, mathematical, arithmetic and/or statistical utilities, device-handling utilities, segment-specific timing utilities, and/or intra-segment resource allocation utilities (e.g., local memory allocation utilities). Many other utilities are possible as well.

At block 450, one or more rules of engagement are determined for the plurality of segments. The rules of engagement may specify guidelines and/or rules for interactions between software entities within the software architecture. See Table 1 above for example rules of engagement.

At block 460, software is developed to control the segmented and layered system. The software is based on the functionality, the segment integrator, and any functional integrators for each segment in the plurality of segments and the one or more rules of engagement. The segmented and layered system includes a computing device, and the software is executable on the computing device. The software may be automatically generated and/or written by human software developers. For example, a software-generation tool, such as the Simulink® software package from The MathWorks, Inc.™ of Natick, Mass., may generate one or more software entities for flight management.

After completing block 460, method 400 may end.

CONCLUSION

Exemplary embodiments of the present invention have been described above. Those skilled in the art will understand, however, that changes and modifications may be made to the embodiments described without departing from the true scope and spirit of the present invention, which is defined by the claims. It should be understood, however, that this and other arrangements described in detail herein are provided for purposes of example only and that the invention encompasses all modifications and enhancements within the scope and spirit of the following claims. As such, those skilled in the art will appreciate that other arrangements and other elements (e.g. machines, interfaces, functions, orders, and groupings of functions, etc.) can be used instead, and some elements may be omitted altogether.

Further, many of the elements described herein are functional entities that may be implemented as discrete or distributed components or in conjunction with other components, in any suitable combination and location, and as any suitable combination of hardware, firmware, and/or software.

What is claimed is:

1. A segmented and layered system comprising a plurality of devices, wherein the segmented and layered system comprises an aerial vehicle, the segmented and layered system further comprising:
   a computing device;
   data storage that stores instructions executable on the computing device to control the segmented and layered system;
   a plurality of segments, each segment comprising a plurality of software entities arranged in one or more layers, wherein each segment is associated with one or more devices in the plurality of devices, and wherein one or more software entities of the plurality of software entities for the segment is assigned to each of the associated one or more devices;
   a segment integrator for each segment in the plurality of segments, wherein interaction between the plurality of software entities of segments of the plurality of segments is governed by one or more rules of engagement, and wherein a first rule of engagement of the one or more rules of engagement specifies a first rule of interaction that requires a first device of the one or more devices associated with a first segment in the plurality of segments provide information to each of the one or more devices associated with the first segment in the plurality of segments using a segment integrator for the first segment in the plurality of segments,
   wherein the plurality of devices comprises:
     a control panel;
     an engine control unit (ECU);
     one or more flight control devices;
     one or more navigation devices; and
     one or more communication devices, wherein the one or more communication devices comprise one or more radios, one or more data links, or a combination of one or more radios and one or more data links; and
   a processor, wherein the plurality of segments comprises:
     an electrical segment, configured to interface with the control panel,
     a propulsion segment, configured to interface with the ECU,
     a flight management segment, configured to interface with the one or more flight control devices,
     a navigation segment, configured to interface with one or more navigation devices, and
     a data link segment, configured to interface with the one or more communication devices.

2. The segmented and layered system of claim 1, further comprising:
   one or more payload sensors; and wherein the plurality of segments further comprises a payload segment, configured to control the payload sensors.

3. The segmented and layered system of claim 1, wherein the software further comprises at least one layer for controlling an execution rate of each segment in the plurality of segments.

4. The segmented and layered system of claim 1, wherein the software further comprises at least one layer for supporting functionality across the plurality of segments, wherein the functionality comprises pre-launch functionality, maintenance functionality, launch functionality, flight functionality, and landing operations.

5. The segmented and layered system of claim 1, wherein the flight management segment is configured to control a flight of the aerial vehicle utilizing the one or more flight control devices and wherein the flight management segment comprises flight planning, flight guidance and flight controls functionality.

6. A segmented and layered system comprising a plurality of devices, wherein the segmented and layered system comprises an unmanned aerial vehicle (UAV), the segmented and layered system further comprising:
   a computing device;
   data storage that stores instructions executable on the computing device to control the segmented and layered system;
   a plurality of segments, each segment comprising a plurality of software entities arranged in one or more layers, wherein each segment is associated with one or more devices in the plurality of devices, and wherein one or more software entities of the plurality of software entities for the segment is assigned to each of the associated one or more devices; and
   a segment integrator for each segment in the plurality of segments, wherein interaction between the plurality of software entities of segments of the plurality of segments is governed by one or more rules of engagement, and wherein a first rule of engagement of the one or more rules of engagement specifies a first rule of interaction that requires a first device of the one or more devices associated with a first segment in the plurality of segments provide information to a second device of the one or more devices associated with a second segment in the plurality of segments through a first segment integrator of the first segment and a second segment integrator of the second segment.

7. The segmented and layered system of claim 6, wherein the plurality of segments comprise an electrical segment, a propulsion segment, a flight management segment, a navigation segment, and a data link segment.

8. The segmented and layered system of claim 7, wherein the plurality of segments further comprises a payload segment.

9. The segmented and layered system of claim 6, wherein the one or more layers comprise an integration layer and at least one device layer.

10. The segmented and layered system of claim 9, wherein the at least one device layer comprises an abstract device layer and a physical device layer.

11. The segmented and layered system of claim 10, wherein at least one software entity of the physical device layer interfaces with or controls a device.

12. The segmented and layered system of claim 6, wherein the one or more layers comprise an executive layer, a vehicle controller layer, and a utility layer.

13. The segmented and layered system of claim 12, wherein the executive layer comprises software for controlling execution of each segment, wherein the vehicle controller layer comprises software for ensuring proper execution of external commands and determining a health of the segmented and layered system, and wherein the utility layer comprises software for common functionality shared across segments including data conversion software.

14. The segmented and layered system of claim 6, wherein the segmented and layered system comprises a common service layer, a board support package/operating system layer, and a computing platform layer.

15. The segmented and layered system of claim 14, wherein the common service layer comprises software implementing services required to be used by all segments in the plurality of segments, the board support package/operating system layer comprises software implementing locking mechanisms and communications control, and the computing platform layer manages a processor of the computing device.

16. The segmented and layered system of claim 6, wherein the segment integrator for a given segment in the plurality of segments comprises software to control one or more software entities within the given segment and to share data from the given segment with the other segments in the plurality of segments.

17. The segmented and layered system of claim 6, further comprising a functional integrator comprising software that provides an integrated function for the plurality of segments.

18. The segmented and layered system of claim 6, wherein the first segment and the second segment are the same segment.

* * * * *